(12) United States Patent
Delfosse et al.

(10) Patent No.: US 11,060,575 B2
(45) Date of Patent: Jul. 13, 2021

(54) REAR DISC OF A STACK OF AIRCRAFT CARBON BRAKE DISCS WITH PUCKS, AND BRAKE APPLYING THE SAME

(71) Applicant: SAFRAN LANDING SYSTEMS, Velizy Villacoublay (FR)

(72) Inventors: Ronan Delfosse, Moissy-Cramayel (FR); Aurélie Cohenca-Maroune, Moissy-Cramayel (FR); Joseph Vitti, Moissy-Cramayel (FR); Romain Le Floch, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 16/555,785

(22) Filed: Aug. 29, 2019

(65) Prior Publication Data

US 2020/0072304 A1 Mar. 5, 2020

(30) Foreign Application Priority Data

Aug. 29, 2018 (FR) ...................................... 18 57775

(51) Int. Cl.
*F16D 65/095* (2006.01)

(52) U.S. Cl.
CPC .................................. *F16D 65/095* (2013.01)

(58) Field of Classification Search
CPC ........ F16D 65/095; F16D 55/40; F16D 55/36; F16D 65/122; F16D 55/38; F16D 65/0043; F16D 65/126; F16D 2055/0058
USPC ................. 188/73.39, 71.5, 71.7, 71.3, 71.6, 188/218 XL, 18 A
See application file for complete search history.

(56) References Cited

U.S. PATENT DOCUMENTS

| 4,146,118 A | | 3/1979 | Zankl | |
|---|---|---|---|---|
| 5,494,138 A | * | 2/1996 | Scelsi | F16D 55/36 188/18 A |
| 5,551,534 A | * | 9/1996 | Smithberger | F16D 55/36 188/250 B |
| 5,558,186 A | * | 9/1996 | Hyde | F16D 55/40 188/218 XL |
| 5,862,890 A | * | 1/1999 | Long | F16D 55/36 188/71.5 |
| 5,992,577 A | | 11/1999 | Souetre | |
| 6,142,720 A | * | 11/2000 | Edwards | F16B 19/06 411/15 |

(Continued)

*Primary Examiner* — Pamela Rodriguez
(74) *Attorney, Agent, or Firm* — Muncy, Geissler, Olds & Lowe, P.C.

(57) ABSTRACT

A rear disc of a stack of aircraft carbon brake discs intended to rest against one end of the torque tube of the brake on which the disc stack is threaded, the support being provided by pucks secured to the rear disc by rivets, each inserted into a through hole in the rear disc and a hole opposite one of the pucks. According to the invention, each rivet has a cylindrical rod inserted into the holes of the rear disc and the puck and having an end deformed against the puck, and a head having a circular cylindrical portion with a conical base having an outer peripheral surface connected to a conical surface of the base by a fillet, and the disc through hole has a first portion adapted to receive the rod of the adjusting rivet, a second portion adapted to receive the circular cylindrical portion of the head of the adjusting rivet, and a transition conical portion adapted to receive the conical base of the rivet head.

7 Claims, 1 Drawing Sheet

(56) References Cited

U.S. PATENT DOCUMENTS 10,228,030 B2 * 3/2019 Kendricks ............... F16D 55/36

* cited by examiner

REAR DISC OF A STACK OF AIRCRAFT CARBON BRAKE DISCS WITH PUCKS, AND BRAKE APPLYING THE SAME

The invention applies to the connection between an aircraft carbon brake rear disc and pucks attached to the rear disc. The rear disc here refers to the carbon element that rests against the brake torque tube via the pucks. This is usually the last stator disc in the stack of the carbon brake discs. This rear disc is also called the rear plate

BACKGROUND OF THE INVENTION

Providing the rear disc with pucks intended to rest in brake torque tube housings provided for this purpose is known. This support allows the pressure force applied to the discs to be transferred to the torque tube during braking, while allowing the pucks to slightly slide in the housings. The pucks are generally attached to the rear disc by means of rivets. For this purpose, the rear disc has a hole with a conical shoulder through which a rivet is inserted so that its convex or flat head with a conical base rests on the conical shoulder of the hole. The rivet rod passes through the puck and its end is then deformed against it to secure the puck to the rear disc. However, under certain circumstances, damage to the rear disc, including the extraction of the rivet, has been observed. In addition, positioning the rivet is delicate, since the rod thereof must be inserted into a hole fitted at the bottom of a deep hole, whereas the rivet head hides the rivet.

PURPOSE OF THE INVENTION

The invention aims to propose an improved fixing of the pucks on the rear disc of an aircraft brake carbon discs stack, reducing the risk of damage and facilitating its implementation.

SUMMARY OF THE INVENTION

To achieve this goal, a rear disc of an aircraft brake carbon discs stack is proposed to rest against one end of the brake torque tube on which the disc stack is threaded, the support being provided by means of pucks secured to the rear disc by rivets each inserted into a through hole in the rear disc and a hole opposite a puck. According to the invention, each rivet has on the one hand a cylindrical rod inserted into the holes of the rear disc and of the puck and having one end deformed against the puck, and on the other hand a head having a circular cylindrical portion with a conical base comprising an external peripheral surface connected to a conical surface of the base by a connecting fillet, the through-hole of the disc comprising a first portion adapted to receive the rod of the adjustment rivet, a second portion adapted to receive the circular cylindrical portion of the head of the adjustment rivet, and a transition conical portion adapted to receive the conical base of the head of the rivet.

Thus, the bearing surface of the rivet on the rear disc is greatly increased due to the outer peripheral surface of the cylindrical head, which reduces caulking pressures during braking and thus reduces the risk of damaging carbon. In addition, the fillet prevents the head from damaging carbon. Finally, the cylindrical head acts as a rivet guide skirt in the portion of the rear disc hole ahead of the shoulder, greatly facilitating the positioning of the rivet in its housing and also limiting the risk of damaging carbon if the rivet loses its tension.

DESCRIPTION OF THE FIGURES

The invention will be better understood upon reading the following description of one specific embodiment of the invention, and while referring to the appended figures, wherein.

DETAILED DESCRIPTION OF THE INVENTION

The invention applies to the connection between an aircraft carbon rear brake disc 4 and pucks 5. Rear disc means the carbon element which rests, through the pucks, against the end of the brake torque tube on which the disc stack is threaded. This is usually the last stator disc in the brake discs stack.

Figure 1:
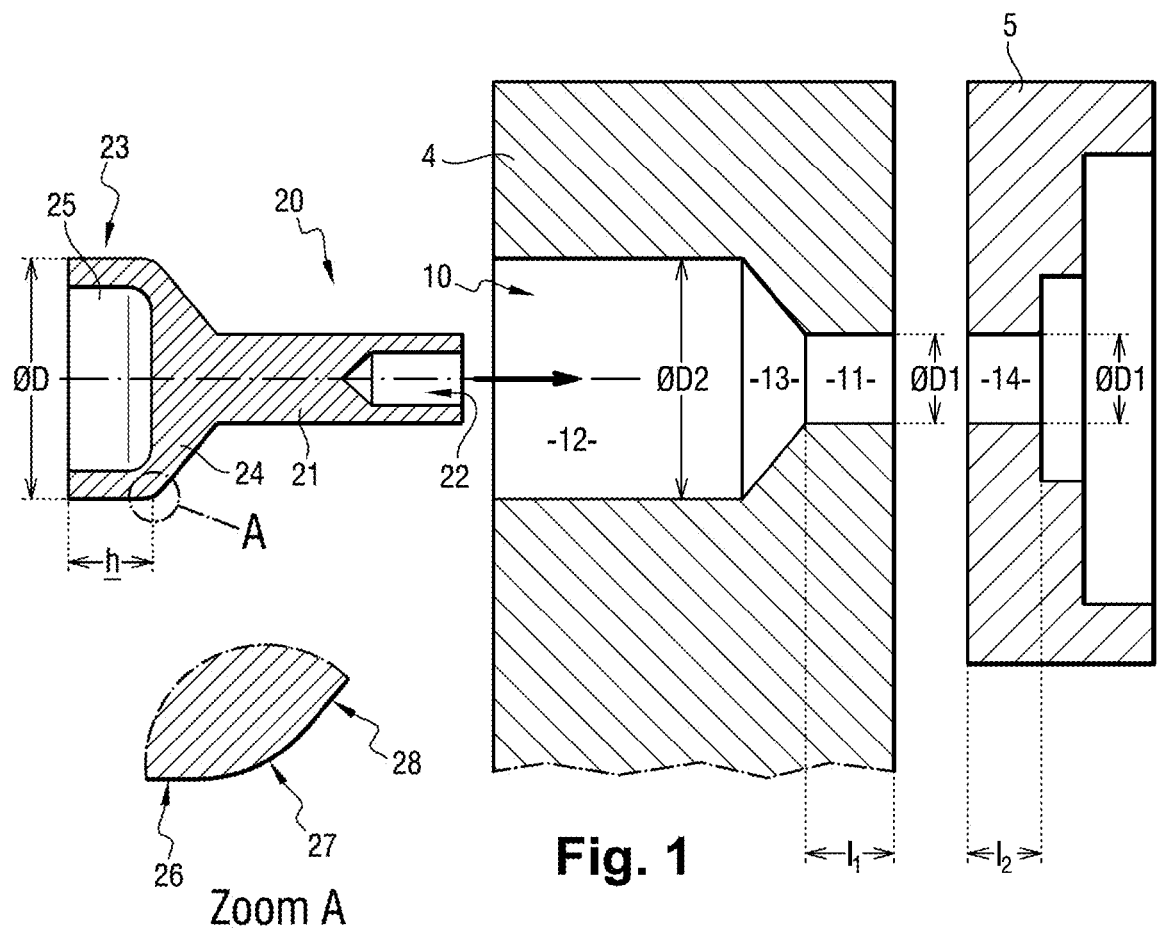
FIG. 1 is a cross-sectional view along a central axis of the brake of an aircraft rear brake disc at one of the holes receiving a rivet for fixing a puck being secured according to the invention.

According to the invention, each puck 5 is attached to the rear disc 4 according to the following provisions. As shown in FIG. 1, the rear disc 4 includes, for each puck 5, a through hole 10 with a first portion 11 with a first diameter D1 on the side intended to receive the puck 5, and a second portion 12 with a second diameter D2 larger than the first diameter, the transition between the two portions being provided by a conical shoulder 13. The puck 5 has a through hole 14 with a diameter equal to or similar to D1.

To secure the puck 5 to the rear disc 4, a rivet 20 is used which, according to the invention, has a rod 21 with a diameter slightly smaller than D1 to be able to fit into the first portion 11 of the hole 10 of the rear disc 4 and into the hole 14 of the puck 5. The rod 21 here has a hollow end 22 for its crushing against the puck 5. The rivet 5 also has a head 23 which includes a conical base 24 intended to rest against the conical shoulder 13 of the hole 10, surmounted by a hollow circular cylindrical portion 25 with an external diameter D slightly smaller than D2 so that it can be fitted into the second portion 12 of the hole 10 of the rear disc 4. The circular cylindrical portion 25 of the head 23 thus forms a skirt that guides the rivet 20 when it is placed in the hole 10 and ensures that the rod 21 actually penetrates into the first portion 11 of said hole, without being askew.

Figure 2:
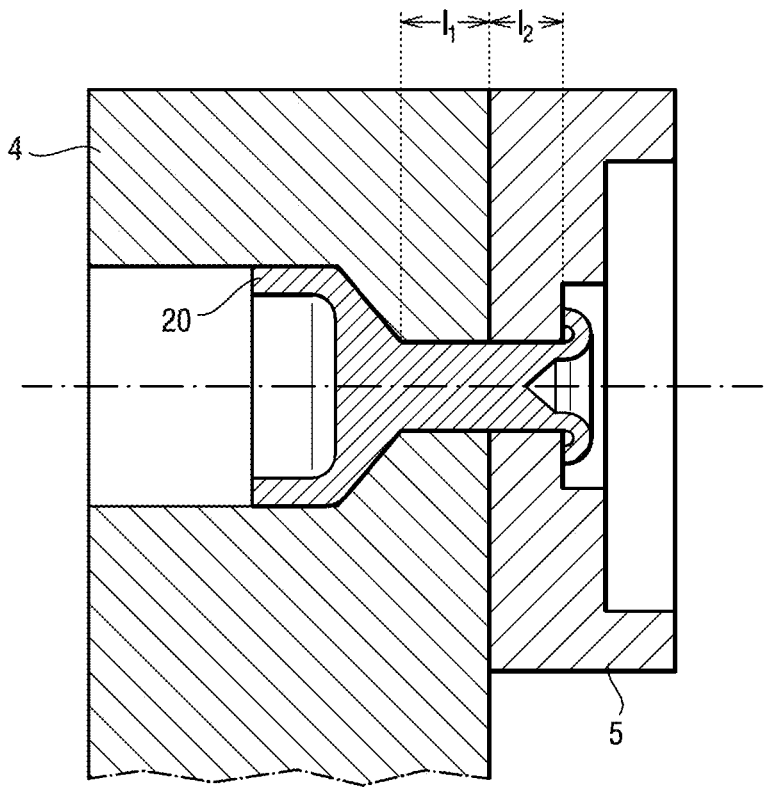
FIG. 2 is a view similar to that of FIG. 1, showing the puck secured to the rear disc.

As shown in FIG. 2, the end of the rod 21 is then crushed against the puck 5 to secure it to the rear disc 4. The conical base 24 then rests against the conical shoulder 13, and the peripheral outer surface 26 of the circular portion 25 of the head 23 constitutes a bearing surface against the carbon of the rear disc with a large surface area able to reduce the caulking pressure between the rivet 20 and carbon. In addition, a fillet (see detail A in FIG. 1) connects the peripheral outer surface 26 of the circular portion 25 to a conical outer surface 28 of its conical base 24, further reducing the risk of damaging carbon on the rear disc 4.

Preferably, the circular cylindrical portion 25 of the head 23 has a height $\underline{h}$ equal to at least 20% of the outer diameter D of said portion. In addition, when the rivet 20 is fitted, the length $l_1$ of the portion 11 of diameter D1 of the hole 10 of the rear disc 4 is greater than the length $l_2$ of the hole 14 of the puck 5. Preferably, the length $l_1$ is similar to the length $l_2$, preferably in a range of 80% to 120% of the length $l_2$. These provisions further reduce the risk of damaging carbon on the rear disc 4.

The invention is not limited to what has just been described, but encompasses every alternative solution within the scope of the claims. In particular, although here the rivet head is hollow for mass reasons, the rivet head may be solid. However, it is important that the head has a conical base followed by a circular cylindrical portion.

The invention claimed is:

1. A rear disc of a stack of aircraft carbon brake discs intended to rest against one end of a torque tube of the brake on which the stack is threaded, support being provided by means of pucks secured to the rear disc by rivets each inserted into a through hole in the rear disc and a hole opposite one of the pucks, wherein each rivet has a cylindrical rod inserted into the holes of the rear disc and of the puck and having an end deformed against the puck, and a head having a circular cylindrical portion with a conical base having an outer peripheral surface connected to a conical surface of the base by a fillet, and wherein the disc through hole has a first portion adapted to receive the rod of one of the rivets, a second portion adapted to receive the circular cylindrical portion of the head of one of the rivets, and a transition conical portion adapted to receive the conical base of the rivet head.

2. The rear disc according to claim 1, wherein the rivet rod has a hollow end.

3. The rear disc according to claim 1, wherein the circular cylindrical portion of the rivet head is hollow.

4. The rear disc according to claim 1, wherein the circular cylindrical portion of the rivet head has a height equal to at least 20% of an outer diameter of the circular cylindrical portion.

5. The rear disc according to claim 1, wherein the first portion of the rear disc hole has a length between 80% and 120% of a length of the hole opposite the puck.

6. An aircraft brake including a rear disc according to claim 1.

7. A brake system, comprising:
a brake disc having through holes;
a plurality of pucks having through holes; and
a plurality of rivets securing the pucks to the brake disc, the plurality of rivets being received in the through holes of the brake disc and the pucks, each of the plurality of rivets comprising:
a cylindrical rod inserted into the through holes of the brake disc and of the pucks and having an end deformed against the puck; and
a head having a circular cylindrical portion with a conical base having an outer peripheral surface connected to a conical surface of the base by a fillet,
wherein the disc through holes each have a first portion adapted to receive the cylindrical rod of one of the rivets, a second portion adapted to receive the circular cylindrical portion of the head of one of the rivets, and a transition conical portion adapted to receive the conical base of the head.

* * * * *